3,429,861
**PROCESSES FOR POLYMERIZATION OF ACRYLO-
NITRILE USING ORGANOMETALLIC COORDI-
NATION COMPLEXES AS CATALYSTS**
Robert Chiang, Durham, Roger A. Evans, Chapel Hill,
and Jerome H. Rhodes, Raleigh, N.C., assignors to
Monsanto Company, St. Louis, Mo., a corporation of
Delaware
Original application Mar. 30, 1964, Ser. No. 355,602.
Divided and this application Dec. 21, 1965, Ser.
No. 515,443
U.S. Cl. 260—88.7  6 Claims
Int. Cl. C08f 1/28, 3/74; B01j 11/00

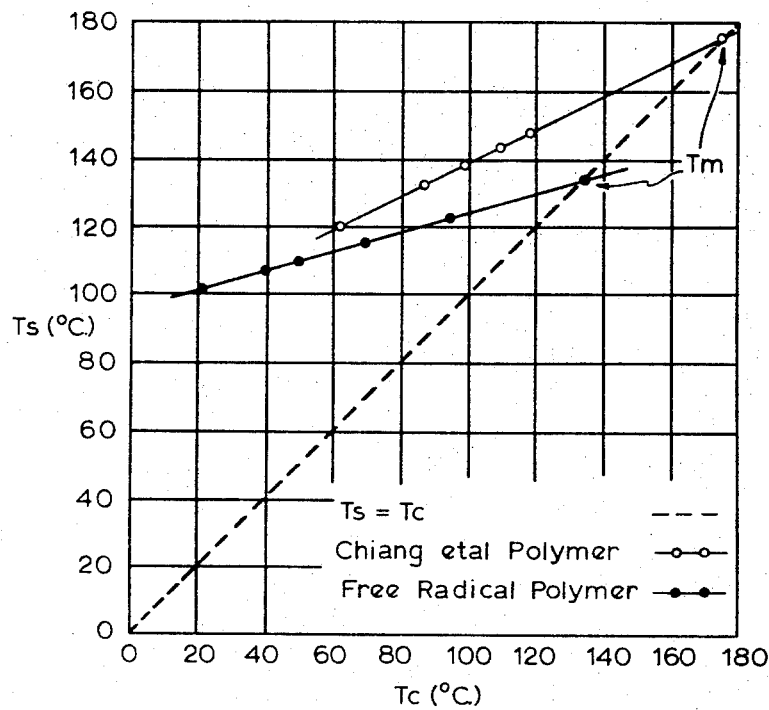
Dissolution Temperature (Ts) as a Function of Crystallization Temperature (Tc) for Polymer Samples

ABSTRACT OF THE DISCLOSURE

Catalyst represented by the formula $$M[M'''(R)_{4-i}(SR)_i]_m$$

wherein M is an alkali or alkaline earth metal, M''' is a Group III–A metal, preferably aluminum, R is a monovalent hydrocarbon radical having up to 12 carbon atoms, $i$ is 1–4 and $m$ corresponds to the valence of M having been prepared and used to initiate polymerization of acrylonitrile, preferably at low temperatures to produce polyacrylonitrile having unusually high decomposition temperatures and solution and crystallization temperatures in propylene carbonate higher than previously observed. Physical properties of the novel polymers are indirect evidences of highly ordered acrylonitrile polymers.

---

This application is a division of copending application Ser. No. 355,602, filed Mar. 30, 1964, and now abandoned.

This invention relates to methods by which a novel class of organometallic coordinate complex polymerization initiators is prepared.

An object of this invention lies in the initiation of the polymerization or acrylonitrile with a novel class of organometallic coordination complexes.

A further object of the invention lies in the preparation of a novel homopolymer of acrylonitrile.

The invention further relates to new and useful fibers manufactured by extrusion of a novel homopolymer of acrylonitrile.

Processes for the polymerization of acrylonitrile over a broad range of conditions using a variety of anionic and free-radical type catalysts are known in the art. However, the polymers resulting from such processes when processed to the textile fiber have generally been possessed of poor color, heat and dimentional stability. A widely employed means for improving the fiber properties of acrylonitrile polymers has been to employ comonomers in the polymerization. The use of copolymers of acrylonitrile to prepare fibers has been found advantageous and has found broad commercial acceptance. However, there remains the basic problem relating to means for improving the quality of polyacrylonitrile so that the fibers manufactured for textile applications are possessed of good color and dimensional stability. This invention is concerned with the preparation of unique homopolymers of acrylonitrile by polymerization employing a novel organometallic coordinate complex as an initiator system. The properties of the novel homopolymer differ from any known homopolymers of arylonitrile in several important respects.

More particularly, this invention provides for methods for the preparation of a new class of organometallic coordination complexes which comprise (1) the reaction of an alkali metal complex or an alkaline earth metal complex of a tetrahydrocarbyl derivative of a Group III–A metal with a mercaptan or (2) by the reaction of an alkali or an alkaline earth metal complex of a tetrahydrocarbyl derivative of a Group III–A metal with elemental sulfur and (3) by the reaction of a trihydrocarbyl derivative of a Group III–A metal with an alkali mercaptide or an alkaline earth metal mercaptide.

The term Group III–A metal as used throughout this description and in the accompanying claims refers to and is intended to include all of the elements listed in Group III–A of the Periodic Chart of Elements found on page 57 of Lange's Handbook of Chemistry, 8th Ed., (1952).

The organometallic coordination complexes produced by this invention are useful as initiators in solution polymerization processes conducted a low temperatures to prepare unique homopolymers of acrylonitrile, the several properties of which render the polymers unlike those heretofore described.

While the novel catalysts of this invention are quite active in the solution polymerization of acrylonitrile at low temperatures, their activity appears to be specific. Attempts to copolymerize acrylonitrile with vinyl acetate have been unsuccessful. Moreover, the novel catalysts of this invention do not initiate polymerization of propylene.

This invention further relates to the polymerization of acrylontrile in solution at low temperatures in the presence of the novel catalysts to prepare a highly regular homopolymer. The physical properties of the polymer of this invention measured by diverse means hereinafter more completely described differ in several important respects from polyacrylonitrile produced using known free radical or anionic catalysts.

The polyacrylonitrile prepared according to this invention can be spun to produce textile fibers having good heat stability and dimensional stability.

These and other advantages will become apparent to those skilled in the art in the ensuing description of the invention.

The novel catalysts of this invention comprise the group of organometallic coordination complexes represented by the formula, $$M[M'''(R)_{4-i}(SR)_i]_m \qquad (I)$$

wherein M is an alkali metal or an alkaline earth metal, R is a monovalent hydrocarbon radical, $i$ is an integer of from 1 to 4 and $m$ is an integer of from 1 to 2 which corresponds to the valence of M. M''' is a Group III–A metal, preferably aluminum.

Thus, where M is an alkali metal, the catalysts may be coordination complexes illustrated by the following formulas, $$Na[Al(CH_2-CH_3)_3(S-CH(CH_2)_2CH_3)] \qquad (II)$$

$$Li\left[Al\left(CH_2-\!\!\left(CH_3\right)_2\right)_2\!\!\left(S-\!\!\left\langle\bigcirc\right\rangle\right)_2\right] \qquad (III)$$

$$K[Al(CH_2-CH_2-CH_3)_3(S-CH\!\!\begin{smallmatrix}CH_2-CH_2\\ \\CH_2-CH_2\end{smallmatrix}\!\!CH_2)] \qquad (IV)$$

When M is an alkaline earth metal the catalyst complex may be represented by a formula, $$Mg[Al(CH_2-\!\!(CH_2)_4\!\!-CH_3)_3(S-CH_3)]_2 \qquad (V)$$

The R radicals may be the same or different monovalen hydrocarbon radicals containing up to about 12 carbon atoms. They may be aryl, alicyclic or aliphatic. Examples of the aryl radicals are phenyl, tolyl, xylyl and naphthyl. The alicyclic radicals are exemplified by cyclopentyl, methyl cyclopentyl and cyclohexyl radicals. When R is an aliphatic radical the catalyst complexes may contain radicals such as dodecyl, nonyl, octyl and heptyl. The preferred R radicals are the lower aliphatic radicals such as ethyl, propenyl, isopropyl, butyl, isobutyl, tertiary butyl, pentyl and hexyl. Examples of such hydrocarbon radicals may be seen in Formulas II–V above. Where the R radicals differ, examples of useful catalyst complexes of this invention may be represented by the following formulas:

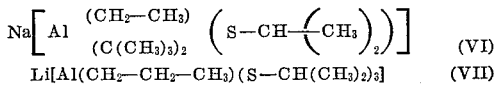

Li[Al(CH₂—CH₂—CH₃)(S—CH(CH₃)₂)₃]   (VII)

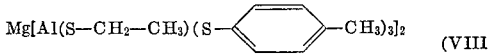

The symbol $i$ represents an integer of from 1 to 4 and varies according to the number of —SR radicals. Formulas II, III, VII and VIII represent complexes where $i$ varies from 1 to 4. The symbol $m$ corresponds to the valence of M and may be 1 or 2 as illustrated in Formulas II and VIII.

The preferred catalyst complexes of this invention are the compounds falling under the following formula.

$$M[AlR_3(SR)]_m \quad (IX)$$

Examples of compounds falling within the class of complexes represented by Formula IX may be represented by Formulas IV and V. This class of catalysts comprises compounds which are more effective catalysts, more simply and more economically produced than those having a higher sulfur content. The latter advantages are further and more particularly realized when in the preparation and use of those complexes wherein M is an alkali metal. Thus, where M' represents an alkali metal the complexes represented by the following formula are the highly preferred catalysts of this invention.

$$M'[AlR_3(SR)] \quad (X)$$

Examples of these highly preferred catalysts falling under Formula X may be represented by the following formulas.

$$Na[Al(CH_2CH_3)_3(S—CH(CH_3)_2)] \quad (XI)$$

$$Li[Al(CH_2—CH_3)_3(S—CH(CH_3)_2)] \quad (XII)$$

$$K[Al(CH_2—CH(CH_3)_2)_3(S—CH_2CH_3)] \quad (XIII)$$

The novel catalyst complexes of this invention may be prepared by reacting a mercaptan with a complex having the formula $M[M'''R_4]_m$ in a molar ratio of from about $0.5_m:1$ to about $4_m:1$. In the preparation of the preferred catalysts wherein $i$ is 1 it is desirable to employ proportions of the reactants in a molar ratio of about $1_m:1$.

In an alternate procedure the catalyst complexes wherein $i$ is 1 may be prepared by contacting about mmoles of a trihydrocarbyl derivative of a Group III–A metal having the formula $M'''R_3$ with each mole of an alkali metal mercaptide or an alkaline earth metal mercaptide employed.

The catalyst wherein $i$ is 1 has also been prepared by contacting the complex $M[M'''R_4]_m$ with less than a molar equivalent of elemental sulfur. Usually about 0.5 mmole of sulfur per mole of the complex provides a good working catalyst.

The catalyst complexes wherein $i$ is an integer of from 2 to 4 may be conveniently prepared by reacting from about 1 to about 3 mmoles of a mercaptan for each mole of $M[M'''R_3(SR)]_m$ wherein the latter coordination complex can be prepared by any one of the aforesaid procedures. Where it is desired to prepare the catalysts wherein $i$ is greater than 1 the procedure first described is normally employed using an excess of the mercaptan.

The mercaptans of the formula RSH used in the procedures described comprise a well known class of chemical compounds. As above indicated the R radicals are hydrocarbon radicals and may be aryl, alicyclic, or aliphatic usually having up to about 12 carbon atoms, examples of which are phenyl mercaptan, xylyl mercaptan, cyclohexyl mercaptan, isopropyl mercaptan, isobutyl mercaptan and hexyl mercaptan. Mixtures of mercaptans may be employed without departing from this invention.

The alkali metal and alkaline earth metal mercaptides used to produce the novel catalysts by a method of this invention are also a known class of chemical compounds. The mercaptides may be represented by the formula $M(SR)_m$ where the R radicals comprise the same group as above described for the mercaptans. The value of $m$, 1 or 2, will, of course depend on the valence of M.

Compounds identified by the formula $M'''R_3$ employed in the preparation of the catalysts of this invention are known in the art. As above indicated M''' may be any Group III–A metal, although aluminum is preferred. The R radicals conform to the descriptions above given in the definition of other reactants. Examples of suitable compounds of this class are diisobutyl, t-butyl aluminum, triethyl aluminum, phenyl, diisopropyl aluminum and tricyclohexyl aluminum.

Compounds having the formula $M[M'''R_4]_m$ are likewise known in the art. While their use in the procedures of this invention is not limited to any particular means by which they are prepared, the compounds used in this invention must be relatively pure to ultimately provide the novel polymers and fibers hereinafter described. A convenient method for the preparation of such complexes is by contacting a dispersion of an alkali metal or alkaline earth metal in a suitable inert liquid medium such as toluene or hexane with an above described compound having the formula $M'''R_3$. Examples of this class of complexes are $Na[Al(CH_2—CH_3)_4]$, $Li[Al(CH_2—CH_3)_4]$, $Mg[Al(CH_2—CH_3)_4]_2$ and $Na[B(CH_2—CH_3)_4]$.

Except for molar proportions and quality of the reactants, the conditions empolyed in the above described procedures are generally the same. Thus, the catalyst preparations are normally conducted in a liquid medium to provide a means for contacting the reactants, each with the other. The liquid medium should be anhydrous and inert to the reactants and products. The liquid medium should serve to dissolve, partially or completely, one or all of the reactants and products in a given reaction system. Suitable liquid media for the reactions according to the above described methods for preparing the catalysts may be selected from the normally liquid aromatic and paraffinic hydrocarbons such as benzene, toluene, n-hexane and n-heptane. The amount and quality of liquid medium employed in a given system are not critical so long as adequate contact is maintained.

The conditions of temperature, time and pressure have not been found to constitute critical limitations to the methods for the preparation of the catalysts of this invention. Ambient temperatures are conveniently employed. However, the temperature normally used is that which provides the desired degree of solubility of one or more reactants in any particular solvent. The range of from about 20° C. to about 100° C. normally will provide an adequate temperature range for carrying out the catalyst preparations. The pressures under which the reactions are conducted are likewise not critical and atmospheric pressure will normally provide a convenient and satisfactory condition. Elevated pressures may be employed to accommodate procedural techniques, such as autogenous pressure found when a reaction vessel is sealed against the atmosphere and heated, or where the reaction is conducted above the boiling point of the liquid medium. Such variations of conditions of temperature and pressure have not been found to alter the course of the reaction.

The reactions may be conducted in a conventional vessel designed to exclude oxygen and moisture from the atmosphere. It is necessary to blanket the liquid reaction system with nitrogen, argon or other available inert gas or provide other means to preclude contamination of the reaction mixture with oxygen and moisture.

The preferred mode of contacting the reactants in the reactions described is to add a solution or dispersion of the sulfur or sulfur containing reactants to a solution or dispersion of the Group III–A metal containing reactant. However, the catalysts of this invention are formed by adding the reactants in reverse order or by adding them simultaneously.

Reactions are usualy spontaneous. However, the reactions have been allowed to proceed up to an hour. In cases where the reactants are soluble only to a slight extent in a liquid medium more time may be allowed for the completion of the reaction. In such cases an increase in the temperature of the recation system may be employed to speed the reaction toward completion.

Insofar as the complexes are air and moisture sensitive, they are preferably not separated from the reaction mixture prior to their use in the polymerization of acrylonitrile. However, if desired, the liquid medium may be removed by conventional means, such as by vacuum distillation, whereupon the catalysts remain as solid crystalline residues. Some or all of the catalyst complex may precipitate from the liquid medium upon formation in which case enough dimethylformamide or other polymerization medium necessary to redissolve the catalyst may be added to the reaction mixture to provide a catalyst solution ready for use in the polymerization sequence.

The polymerization of acrylonitrile according to this invention is accomplished by adding acrylonitrile to the non-aqueous solvent to be used as the polymerization medium. Then the temperature of the acrylonitrile solution is raised or lowered, to between about −100° C. to about 75° C. The catalyst in solution is added to the acrylonitrile solution and polymerization is allowed to proceed to the desired degree of completion. The polymerization system should be kept free of oxygen and moisture because the catalysts of this invention are sensitive to those materials. Normally, the reaction is accomplished under a pressurized blanket of nitrogen or other inert gas. The polymerization may be stopped at any time by conventional short-stopping agents such as water, methanol, HCl or oxalic acid. If desired the polymerization may be allowed to proceed to completion. It has been discovered that the polymers produced with the catalysts of this invention were "living" in cases where the monomer has been exhausted. Accordingly, the acrylonitrile may be added in a stepwise or in a continuous manner.

The choice of non-aqueous polymerization solvent employed in the practice of this invention has not been found to be critical. Of course it is known that a change in solvents in a given polymerization system will normally alter the reaction kinetics. Such changes may, however, be compensated by appropriately adjusting the temperature, the monomer concentration and catalyst concentration in a manner generally know to those skilled in the art. The solvent may be an aromatic hydrocarbon such as toluene or benzene. However, polar solvents such as dimethylformamide (DMF), dimethylacetamide (DMA) and dimethylsulfoxide (DMSO) are preferred. Mixtures of solvents such as DMF and DMA and also toluene and DMF have been successfully employed.

The concentration of the catalyst is significant to the preparation of the novel polymers of this invention with respect to the degree of conversion based on the amount of monomer used. Thus, catalyst concentrations as low as 0.01 millimoles/mole of monomer have been found to provide an appreciable degree of conversion of the monomer to polymer. Normally, the catalyst concentrations will vary from about 0.01 to about 0.1 mole percent of catalyst on the basis of acrylonitrile. Complete conversions have been realized with catalyst concentrations as low as 0.1 mole percent when operating at −78° C. Concentrations of catalyst higher than those necessary to complete the polymerization may be used, if desired, to control the molecular weight. The high efficiency of the catalysts is important from a practical viewpoint because they may be used at the trace amounts indicated to carry the reaction to completion. Moreover, the low concentrations of catalyst necessary for completion of the polymerization allow the recovery of polymers of high chemical purity. The terms catalysts and initiators are used interchangeably herein.

The time allowed for polymerization depends on factors such as the temperature, the particular catalyst, its concentration, the solvent used and the degree of conversion desired and may range from about 5 minutes to several days. Where temperatures are kept low the catalyst remains active over long periods of time.

The catalyst complexes of this invention have been found to initiate the polymerization of acrylonitrile over a very broad temperature range. Polymerization is initiated at temperatures of from about −100° C. to about 75° C. However, the particular temperatures used in the polymerization process have been found to be very important insofar as the regularity of the polymers produced is concerned. The unique polymers of this invention must be prepared by polymerization within the range of from about −100° C. to about −30° C. At temperatures around 0° C. the regular structure and unique properties of polyacrylonitrile are sacrificed by structural irregularities such as chain-branching and ketene-imine formation, all of which tend to result in color formation, lowering of decomposition temperatures, lowering of solution temperatures and in general a loss of desirable properties. Moreover, the activity of the catalyst and polymer growth at higher temperatures are diminished. The preferred temperatures, therefore, are those in the lower range of from about −85° C. to about −30° C., about −78° C. being particularly preferred.

The molecular weight of the polymers produced may be varied in the fiber forming range from about 20,000 to about 500,000 by interplay of the conditions of time, temperature, monomer concentration and particularly the catalyst concentration in a given system in a manner generally known in other polymerization processes.

The following examples are provided to illustrate the several aspects of this invention. However, the invention is not intended to be limited to the embodiments described in the several examples.

Example I

The organometallic coordination complex represented by the formula Na[Al(CH$_2$—CH$_3$)$_3$(S—CH(CH$_3$))] was prepared by adding 2.50 millimoles of isopropyl mercaptan to a warmed solution of 2.50 millimoles of

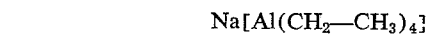

in 10 cc. of toluene. The product was rapidly formed as a fine white precipitate.

A 2 cc. portion of the catalyst as a slurry in toluene was added to 5 cc. of acrylonitrile dissolved in 25 cc. of DMF at a temperature of −78° C. After the polymerization had been allowed to proceed for 1.5 hrs. a solution of pure-white polymer of acrylonitrile was formed. The polymerization was then terminated by the addition of a 3% HCl solution in DMF and methanol. The polymer was then recovered by precipitation in methanol, filtration, washing and drying.

Examples II–VI

Organometallic complexes having a varying sulfur content were prepared according to the procedure of Example I where the RSH:M[M'''R$_4$]$_m$ molar ratios were 0.5:1, 1:1, 2:1, 3:1, and 4:1. The results of polymerization of 10 cc. of acrylonitrile in 200 cc. of DMF at −78° C. for 18 hours using 0.1 millimole of each catalyst are as follows:

| Ex. | RSH:NaAlR₄ molar ratio | Percent conversion | Ts, ° C. | M.W.×10³ |
|---|---|---|---|---|
| II | 0.5:1 | 77.5 | 148 | 355 |
| III | 1:1 | 42.6 | 147 | 92 |
| IV | 2:1 | 60.2 | 149 | 156 |
| V | 3:1 | 60.3 | 149 | 91 |
| VI | 4:1 | 50.6 | 148 | 80 |

The solution temperatures or dissolution temperatures (Ts, ° C.) were determined in propylene carbonate as hereinafter more fully described. It is interesting to note the consistently high solution temperatures of the novel polymers over a rather wide range of molecular weights and varying species of the initiators.

Example VII

The catalyst complex represented by the formula Li[Al(CH₂—CH₃)₃(SCH(CH₃)₂)] was prepared according to the procedure of Example I by replacing the Na[AlEt₄] of Example I with an equimolar quantity of Li[Al(CH₂—CH)₄]. The product precipitated out in the form of fine white solid.

Example VIII

Example VII was repeated except that the molar ratio or isopropyl mercaptan was doubled to prepare a complex represented by the formula:

Li[Al(CH₂—CH₃)₂(SCH(CH₃)₂)₂]

Upon addition of the mercaptan a precipitate was formed. A small amount of DMF was added to the slurry to dissolve the catalyst.

In the polymerization of 10 cc. of acrylonitrile in 200 cc. of DMF at −78° C. for 18 hours using 0.1 millimole of this catalyst complex a polymer was prepared having a solution temperature in propylene carbonate of 150° C. and a mol. wt. of about 218,000. The conversion was 81.4%.

Example IX

The catalyst complex of the type represented by the formula Na[Al(CH₂—CH₃)(S—CH₂—CH₃)] was prepared by using elemental sulfur in the place of a mercaptan. 2.15 millimols of sulfur (S₂) (0.068 gm.) was vacuum dried at 60° C. for one hour and added to 5 cc. of toluene to form a slurry. The sulfur slurry was then added to 9 cc. of a solution of Na[Al(CH₂—CH₃)₄], (4.24 millimoles) in toluene. The mixture was warmed to about 70° C. for 1 hour and 16 cc. of dry DMF was added. The catalyst solution (0.5 cc.) was added to 4.0 cc. of acrylonitrile dissolved in 62.5 gms. of DMF at −78° C. and the polymerization was allowed to proceed for 19 hours. A white polymer was recovered having a solution temperature of 165° C. in propylene carbonate, and a highest crystallization temperature of 126° C. in the same solvent.

Example V

To prepare the boron analogue of the complex of Example I 6.82 cc. of a solution of boron triethyl in toluene containing 2.05 millimoles per cc. was added to 1.3832 gms. (13.95 millimoles) of vacuum dried sodium isopropyl mercaptide in 10 cc. of toluene. One cc. of the slurry thus formed was found to initiate polymerization acrylonitrile at −78° C.

Examples XI and XII

To a 4.10 cc. of a 25% solution of aluminum triethyl was added 0.6767 gm. (6.0 millimoles) of vacuum dried sodium isopropyl mercaptide to form the catalyst of Example I by an alternate procedure. Toluene (5 cc.) was added to the reaction mixture to provide a total volume of about 10 cc.

Acrylonitrile was polymerized using 1 cc. portions of this catalyst solution as indicated below:

| | Ex. XI | Ex. XII |
|---|---|---|
| cc. DMF | 25 | 25 |
| cc. AN | 2.5 | 2.5 |
| Time (hrs.) | 71 | 20.5 |
| Temp. (° C.) | −78 | −78 |
| Percent Conv. | 100 | 88 |
| Soln. temp. (° C.) | 154 | 150 |
| Cryst. temp. (° C.) | 124 | 120 |
| Mol. wt. ×10³ | 84 | 31 |

Examples XIII–XVI

These examples result from attempts to polymerize propylene using a catalyst complex prepared according to Example I. As a control for the polymerization using the catalyst of this invention propylene was first polymerized using a typical Ziegler-Natta catalyst (TiCl₃/AlEt₃). The conditions of polymerization were the same except as indicated below. The control polymerizations were terminated upon determination that conditions were adequate for substantial polymerization using the known catalyst.

| Ex. | Cat. | Amount, mmoles | Reaction time (hrs.) | Temp., ° C. | Pressure, p.s.i. | Solvent | Yield (g.) |
|---|---|---|---|---|---|---|---|
| XIII | TiCl₃ | 0.60 | 3 | 70 | 60 | 66 cc. heptane | 5.61 |
| | Al Et₃ | 1.80 | | | | | |
| XIV | TiCl₃ | 0.60 | 3 | 70 | 60 | do | 4.05 |
| | Al Et₃ | 1.80 | | | | | |
| XV | Na[AlEt₃(S-iPr)] | 0.65 | 18 | 70 | 60 | 30 cc. toluene and 30 cc. DMF. | None |
| XVI | Na[AlEt₃(S-iPr)] | 1.30 | 18 | 72 | 60 | 50 cc. toluene | None |

Example XVII

A catalyst prepared according to Example I was employed in an attempt to prepare a copolymer of acrylonitrile and vinyl acetate. 1 cc. of the catalyst solution was added to 15 cc. (12 gm.) of acrylonitrile and 1 cc. (1 gm.) of vinyl acetate dissolved in 50 cc. of DMF at 0° C. The reaction mixture was observed to take on a yellow color and after several days no copolymer was formed.

Example XVIII

In a procedure similar to Example I an equivalent amount of the complex Na[Al(iBu)₄] was used instead of sodium aluminum tetraethyl. A 0.2 cc. slurry of this catalyst was used to prepare polyacrylonitrile with a solution temperature in propylene carbonate of 140° C. by adding the catalyst slurry to 4 cc. acrylonitrile dissolved in 25 cc. of DMF at −78° C. A 38% conversion was achieved in 1 hour.

Examples XIX–XXV

While the catalysts of this invention initiate the polymerization of acrylonitrile over a wide temperature range, the temperature at which polymerization is conducted has been found critical with respect to the nature of the polymer produced. To illustrate this discovery a catalyst solution prepared according to Example I was used to initiate polymerization of acrylonitrile in the manner also described in Example I except that the temperature was varied as follows:

| Ex. | Temp. (° C.) | Conversion (percent) | Mol. wt. ×10³ | Solution temp. (° C.) | Crystallization temp. (° C.) |
|---|---|---|---|---|---|
| XIX | −78 | 90 | 215 | 150 | 120 |
| XX | −60 | 23 | 29 | 140 | 110 |
| XXI | −30 | 76 | 210 | 107 | 77 |
| XXII | 0 | 53 | 69 | 65 | |
| XXIII | 25 | 25 | 11.5 | 25 | |
| XXIV | 50 | 20 | 14 | 25 | |
| XXV | 75 | 25 | 21 | 25 | |

Low temperature polymerization of acrylonitrile is known to substantially reduce structural irregularities such as cyanoethylation, ketene-imine formation, ring formation, crosslinking, etc. However, the solution temperatures in propylene carbonate of known homopolymers of acrylonitrile, even the so-called essentially linear polymers having syndiotactic segments described in U.S. Patent 3,117,111 have been found to be much lower than those exhibited by the novel polymers produced herein. Thus, the mere absence of structural irregularities recognized from low temperatures polymerization does not explain the usually high solution temperatures of the unique polymers prepared herein. To illustrate this discovery polymers were prepared using several known anionic initiators and with a free-radical catalyst of the type generally known in the art.

| Example | Initiator | Polym. temp. (° C.) | Solu. temp. (° C.)[1] |
|---|---|---|---|
| XXVI | NaCN | 0 | 95 |
| XXVII | Butyl lithium | −78 | 100 |
| XXVIII | NaSCH(CH₃)₂ | −78 | 110 |
| XXIX | Aluminum acetylacetonate/ZnEt₁ | 5 | ([2]) |
| XXX | K₂S₂O₈/NaHSO₃ | 50 | 125 |

[1] in propylene carbonate
[2] the reaction mixture was dark brown. Evidencing extensive side reactions which render the solution temperature meaningless.

By comparison of the solution temperature of polymers prepared using conventional catalysts to initiate the reaction it has been found that the polymers of this invention result not from low temperature reactions alone, but rather from a cooperation of low temperatures and the presence of the novel coordinate complex initiators.

Polyacrylonitrile may be crystallized from dilute propylene carbonate solution in the form of crystalline platelets with thickness of approximately 100–150 A. The crystals redissolve in the same solvent at a higher temperature. The temperature at which the crystal dissolves or loses its opacity or crystallinity is referred to as dissolution temperature.

Crystals with large surface areas melt at temperatures lower than those with small surface areas. Current theory states that the thickness of the platelets, or the step height, is related to the depression of the melting point, $\Delta T$, by the equation $$\Delta T = (T_m)_\infty - (T_m)_\delta = (T_m)_\infty - T_s = 2\sigma_e (T_m)_\infty / \delta \Delta H_u \quad (A)$$

where $(Tm)_\delta$ or $T_s$ is the dissolution temperature of the platelets of step height, $\delta$, $(T_m)_\infty$ is the dissolution temperature of the platelets of infinite step height, $\sigma_e$ is the interfacial surface energy per unit area of the platelets, and $\Delta H_u$, the enthalpy of fusion.

According to Eq. A, an increase in degree of supercooling results in a decrease in $\delta$. The effect of the crystallization temperature on the step height has been studied with the electron microscope; for example, isothermal crystallization of polyethylene in xylene produces a single crystal with step height higher than those crystallized at lower temperatures. In fact, Eq. A has been used to estimate the surface free energy for the formation of polyethylene crystals; thus Jacksons, Flory and Chiang, Trans. Faraday Soc., 59, 1902 (1963), arrived at a value of 1900 cal. mole⁻¹ of emerging chain repeat unit, or of 70 ergs cm.⁻² and Holland, J. Appl. Phys., 35, 59 (1964), using a similar method arrived at a value of 58 ergs cm.⁻². The latter value results from using a low value of $(T_m)_\infty$, 106° C., in the calculation. In view of the fact that the value of $\sigma_e$ is subject to the mechanism of crystal growth and crystalline order near the interfacial zone of each sample the agreement is excellent.

This investigation extends the study of the effect of the crystallization temperature on dissolution temperature of polymers to polyacrylonitrile and provides means for identification of a novel class of homopolymers of acrylonitrile.

The polymer used in this investigation was prepared according to Example I. Chemical analysis of the polymer indicated no detectable amount of impurities. Found: C, 67.64%; H, 5.60%; and N, 26.54%. Calc'd: C, 67.88%; H, 5.70%; and C, 26.41%. This polymer crystallizes over a wide range of temperatures, enabling the change in step height and in dissolution temperature with change in crystallization temperature to be easily measured.

For electronmicroscopic investigation, the whole polymer was fractionated by elution through a chromatographic column packed with Celite at 82.5° C., using ethylene carbonate as solvent and propylene carbonate as nonsolvent. The viscosity average molecular weight of the fraction was approximately 112,000.

Reagent grade propylene carbonate used for determining the dissolution and crystallization temperature was purified by a procedure in which the propylene carbonate was stirred with active charcoal for 20 hours and then passed through a column containing about ten inches of an anion exchange resin (Mallinckrodt Amberlite IRA–410) at bottom and about 5 inches of a cation exchange resin (IR–120) on top, separated by glass wool. Moisture in the resin was removed by running anhydrous isopropanol through the column prior to use. Propylene carbonate so treated was neutral to methyl red. By careful purification of the solvent, discoloration of the polymer under the severe conditions of crystallization was avoided.

Isothermal crystallization was carried out by the following procedure. A concentrated solution approximately 0.4 g. of polyacrylonitrile prepared according to Example I in 20 cc. of propylene carbonate, was prepared at 180° C. under nitrogen to minimzie oxidative decomposition. Prolonged heating normally produces colored solutions. Polyacrylonitrile prepared by polymerization in the presence of a free-radical initiator such as that used in Example XXX was observed to turn yellow when heated at 150° C. for 30 minutes. However, the novel polymer of this invention did not undergo discoloration even when heated for ½ hour at temperatures as high as 180° C.

About 0.2 cc. of the hot concentrated solution was introduced into 10 cc. of propylene carbonate which had been brought to the desired temperature. By so doing, a rapid temperature adjustment was achieved before the crystallization began. The solution was allowed to crystallize at constant temperature; the time of crystallization varied, of course, with the degree of supercooling. At the highest practical crystallization temperature, crystallization was usually carried out overnight, but sometimes several days was required. The solution was still colorless at the end of crystallization.

The dissolution temperature was determined by introducing the crystallized sample, without drying, directly into a large excess of propylene carbonate, the temperature of which had been so set that a well defined final temperature could be obtained by rapid mixing. By several trials, a precise dissolution temperature was located above which the crystals started dissolving and below which the crystals remained undissolved indefinitely.

The thickness of the crystalline platelets of PAN grown from dilute propylene carbonate solution was determined with a Philips EM 200 electron microscope by the following procedure.

Drops were removed from the crystallized suspensions and deposited onto carbon coated electron microscope grids. After evaporation of solvent, the grids were shadowed with platinum at an angle of 12°. Grids from the three different runs (at 95°, 116° and 125° C.) were shadowed simultaneously to permit direct comparison. From the length of the shadows on the electron micrographs and the shadow angle, the step-heights were determined for each preparation. The values which are given represent averages of many individual measurements.

Values of $T_s$ and $T_c$ are given in Table I. The rate of crystallization decreases drastically with an increase in crystallization temperature. The temperature beyond which the rate of crystallization becomes prohibitively slow is referred to as the highest practical crystallization temperature. The highest practical crystallization temperature for this polymer is 125° C.

The dissolution temperature changes linearly with the crystallization temperature. When the value of $T_s$ is plotted against $T_c$, a straight line is obtained (FIG. 1), which intersects with the line $T_s=T_c$ at the melting point of the crystallite of infinite step height, $(T_m)_\infty$; the value of $(T_m)_\infty$ for this polymer is 175° C. FIGURE 1 also shows $T_s$ plotted against $T_c$ for polyacrylonitrile prepared with the free radical catalyst employed in Example XXX.

Table I.—Dissolution temperature ($T_s$) as a function of crystallization temperature in propylene carbonate of a polymer of acrylonitrile

| $T_s$, ° C.: | $T_c$, ° C. |
|---|---|
| 121.2 | 61.5 |
| 133.5 | 87.4 |
| 138.0 | 98.0 |
| 143.5 | 108.5 |
| 148.0 | 118.0 |
| 152.0 | [1] 125.0 |
| (175) [2] | [2] (175) |

[1] The highest practical crystallization temperature.
[2] Extrapolated values $(T_m)_\infty$.

Electronmicrographs obtained at two different temperatures are given in Table II. The platelet thickness difference resulting from a difference in crystallization temperature of 30° C. is clearly demonstrated. Values of $\delta$ estimated from the micrographs are given in Table II together with the crystallization temperature. The step height changes from 100 A. to 150 A. when the crystallization temperature changes from 95° C. to 125° C. Thus an increase in step height at a rate of 17% for an increase of 10° C. in crystallization temperature is observed.

TABLE II.—STEP HEIGHT ($\delta$) AS A FUNCTION OF CRYSTALLIZATION TEMPERATURE OF A PAN SAMPLE FOR WHICH $(T_m)=175°$ C. PREPARED ACCORDING TO EXAMPLE I.

| $T_c$, ° C. | $\delta$, A. | $\sigma_e$, Cal'd. | |
|---|---|---|---|
| | | Cals. mole | Ergs., cm.$^{-2}$ |
| 95 | 100±15 | 1,950 | 45 |
| 116 | 130±15 | 1,980 | 45 |
| 125 | 150±15 | 1,890 | 43 |
| Av | | 1,950 | 44 |

Substituting into Eq. 1 the measured values of $\delta$, together with the corresponding value of $\Delta T$ and taking $\Delta H_u = 1.16$ kcal. mole$^{-1}$ of repeating unit gives a calculated surface energy, $\sigma_e$, of 1950, 1980, and 1950 at a $T_c$ of 95°, 116° and 125° C., respectively (Table II). Significantly, the value of $\sigma_e$ calculated from the experimental data remains constant over a wide range of temperatures. If the cross sectional area of the chain is taken as 30.54 A.$^2$. this 1950 cal. mole$^{-1}$ of emerging chain repeat unit corresponds to 45 ergs cm.$^{-2}$, as compared with 1900 cal. mole$^{-1}$ or 70 ergs cm.$^{-2}$ for polyethylene. It appears that the surface energies of the crystals of organic polymers are remarkably similar.

The rate of heating during the determination of the dissolution temperature affects the results. In principle, the heating rate should be very slow so that true equilibrium can be realized. On the other hand, the heating rate must be fast as compared to the rate of recrystallization so that a true dissolution temperature can be obtained before recrystallization takes place. It is difficult to compromise between these two requirements. However, a true dissolution temperature can be obtained with high precision if the size of the crystal is large and/or the rate of crystallization is very slow compared to the rate of heating. The dissolution temperature, for example, of polyethylene crystallized from the melt is 110.0° C. in tetralin determined by slow heating. The crystal remains undissolved indefinitely at 109.5° C. With a high degree of supercooling, polyethylene crystallizes so fast that it is impossible to determine the dissolution temperature with the desired precision. On the other hand, polyacrylonitrile crystallizes slowly and it is possible to determine the dissolution temperature with certainty even with a high degree of supercooling. This conclusion is substantiated by the fact that the dissolution temperatures obtained by both fast and slow heating methods are within 1° C. Thus, the dissolution temperatures reported here are to be substantially precise.

Because of the low rate of crystallization of polyacrylonitrile, the dissolution temperature and crystallization temperature can be determined accurately. Consequently, $(T_m)_\infty$ can be obtained with good precision by extrapolating the experimental value of $T_s$ to intersection with the $T_s = T_c$ line. Indirect evidence from other polymers studied serves to support the extrapolation procedure and the resulting values of $(T_m)_\infty$.

Determination of the relationship between the crystallization and dissolution temperature yields useful information concerning the crystallization behavior of polyacrylonitrile. Although the degree of crystalline perfection of polyacrylonitrile is inferior to that of polyethylene as evidenced by the absence of three dimensional order as revealed by X-ray diffraction, polyacrylonitrile displays a crystallization behavior in common with other semi-crystalline polymers. The linear relationship between $T_s$ and $T_c$, the sigmoid relationship of the fractional change in specific volumn as a function of time during crystallization, and the variation of the step height with the temperature of crystallization demonstrate clearly that polyacrylonitrile crystallizes in the same manner as other semi-crystalline polymers.

While the above method is precise in the determination of values for $T_s$ and $T_c$ it has been found that by merely slowly increasing the temperature of a small sample of the bulk polymer in propylene carbonate a solution temperature which varies only several degrees from that obtained by the more precise method can be more readily obtained.

The solution temperatures of polyacrylonitrile polymers are directly related to the thermodynamic melting points $(T_m)_\infty$ of the polymers. Thus, the increased solution temperatures and correspondingly higher melting points are indicative of polymers having a more regular structure. Regularity is known to result from higher tacticity and diminished structural impurities such as chain branching, head-to-head polymerization, cyanoethylation, cross-linking, ketene-imine formation, etc. IR studies indicate that such structural impurities are not dectectably present in the polymers of this invention. Thus, where the IR spectra of two polymers are similar and there is no evidence of structural impurities, the higher solution temperature of one may be attributed to higher tacticity. Preliminary NMR studies tend to confirm these conclusions.

In U.S. Patent No. 3,117,111 to Natta et al. there is described the preparation of polymers which are said to be essentially linear and characterized by sections of the chain which have a syndiotactic configuration of monomer units. No properties of the polymers, other than color ranging from yellow to white, are described. Moreover, there is no description of the means by which linearity, syndiotactic sequences, and the length of syndiotactic sequences were determined, if experimentally determined. No method is believed to be known for the preparation of completely random or completely ordered polyacrylonitrile. Recent NMR studies in the development of methods for determining tacticity of polyacrylonitrile indicate that a normal free radical polyacrylonitrile polymer contains about equal proportions of isotactic and syndiotactic segments. While the length of these syndiotactic segments has not been determined, it appears from indirect evidences that the syndiotactic segments are rather short causing the polymer to be possessed of low tacticity. Studies on a polymer prepared according to the cited Natta et al. patent exhibit no unusual properties. The solution temperatures are no higher than typical free radical and anionic polyacrylonitrile homopolymers. Moreover, these polymers do not appear to possess stability to heat of the order possessed by the polymers of this invention. Thus, while the Natta et al. polymers may, as indicated, contain syndiotactic chain segments, their properties do not indicate that they approach the order and regularity of the polymers of this invention. This is probably due to syndiotactic segments of rather abbreviated length much the same as in the typical free radical polymers. Preliminary NMR studies made on the polymers of this invention tend to confirm the conclusions based on differing solution temperatures.

Examples XXXI–XXXII

The color purity and heat stability of the ionic polymer of Example XXVIII and the free-radical polymer of Example XXX were compared with the novel polymer of this invention prepared according to Example I. The tests were made by placing about 0.5 gm. of each of the polymers into a ½ inch die and forming a tablet under a pressure of about 5,000 p.s.i. The tablets so formed were then placed between polished stainless steel plates and pressed for 5 minutes at 170° C. under a pressure of 5,000 p.s.i. The pressed polymers were in the form of thin circular discs, each of which was divided into four quarters. Each quarter was heated as indicated and then mounted on a piece of black poster board. Using a GE Spectrophotometer the color purity of each polymer was measured after heating at 180°C. for periods varying from 0 to 60 minutes.

| Example | Initiator | Time | Color purity |
|---|---|---|---|
| XXXI | K₂S₂O₈/NaHSO₃ | 0 | 1.4 |
|  | K₂S₂O₈/NaHSO₃ | 10 | 1.0 |
|  | K₂S₂O₈/NaHSO₃ | 30 | 1.1 |
|  | K₂S₂O₈/NaHSO₃ | 60 | >6 |
| XXXII | Na—SCH(CH₃)₂ | 0 | >6 |
|  | Na—SCH(CH₃)₂ | 10 | >6 |
|  | Na—SCH(CH₃)₂ | 30 | >6 |
|  | Na—SCH(CH₃)₂ | 60 | > |
| XXXIII | Na[Al Et₃(SCH(CH₃)₂)] | 0 | 0.2 |
|  | Na[Al Et₃(SCH(CH₃)₂)] | 10 | 0.2 |
|  | Na[Al Et₃(SCH(CH₃)₂)] | 30 | 1.0 |
|  | Na[Al Et₃(SCH(CH₃)₂)] | 60 | 2.7 |

These tests indicate the high color purity of the novel polymer even upon long exposure to heat.

Example XXXIV

The decomposition temperatures for the polymer prepared according to Example I of this invention and polyacrylonitrile prepared using a conventional free-radical catalyst were compared using the method described by Anderson, "Thermogravimetric Analysis of the Pyrolysis Characteristics of Polymers," NAVORD Report No. 6774. The free-radical polymer was found to decompose at 280° C. whereas the novel polymer of this invention decomposed at 310° C.

Example XXXV

The sonic modulus of a conventional free radical polyacrylonitrile fiber was compared with that of a novel fiber of this invention employing the method described by Hamburger, Textile Research Journal, vol. 18, No. 12, pp. 705–743 (1948). The modulus taken at 100° C. of a fiber prepared by spinning a polymer prepared according to Example I was 17 g./d. higher than that of a fiber spun from a conventional free radical polymer. Modulus values taken over a temperature range of from 30° C. to 160° C. were found to run uniformly about 20% higher for the polymer of this invention.

Fibers may be prepared from the novel polymers of this invention by continuously extruding the polymer from solution according to the method described in the U. S. Patent No. 3,088,188. Fibers so spun may be oriented and finished in a manner known in the art to provide useful textile materials possessing superior color and dimensional stability when compared with polyacrylonitrile produced by polymerization reactions using known catalysts.

Other advantages in the practice of this invention will be apparent to those skilled in the art and any departure from the above description which conforms to the present invention is intended to be included within the scope of the claims.

We claim:

1. In a process for the preparation of polyacrylonitrile wherein acrylonitrile is polymerized in a nonaqueous solution, the step which comprises conducting the polymerization in the presence of a catalytic amount of an organometallic coordination complex initiator represented by the formula $$M[M'''(R)_{4-i}(SR)_i]_m$$

wherein M is a metal selected from the group consisting of an alkali metal and an alkaline earth metal, M''' is a Group III–A Metal, R is a monovalent hydrocarbon radical having up to 12 carbon atoms, $i$ is an integer of from 1 to 4 and $m$ is an integer of from 1 to 2 which corresponds to the valence of M.

2. The process of claim 1 wherein $i$ is 1 and the polymerization is conducted at a temperature of from about —100° C. to about —30° C.

3. In a process for the preparation of polyacrylonitrile wherein acrylonitrile is polymerized in a nonaqueous solution, the step which comprises conducting the polymerization at a temperature of from about —100° C. to about —30° C. in the presence of a catalytic amount of an organoaluminum complex initiator represented by the formula $$M'[Al(R)_3(SR)]$$

wherein M' is an alkali metal and R is a monovalent hydrocarbon radical having up to about 12 carbon atoms.

4. In a process for the preparation of polyacrylonitrile wherein acrylonitrile is polymerized in a nonaqueous solution, the step of conducting the polymerization at a temperature of from about —85° C. to about —30° C. in the presence of a catalytic amount of an organoaluminum complex initiator represented by the formula $$Na[Al(R)_3(SR)]$$

wherein R is a monovalent hydrocarbon radical having up to about 12 carbon atoms.

5. The process of claim 4 wherein R is a lower alkyl radical.

6. The process of claim 4 wherein said initiator is the complex represented by the formula
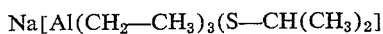
$$Na[Al(CH_2-CH_3)_3(S-CH(CH_3)_2]$$
References Cited
UNITED STATES PATENTS
| 2,445,042 | 7/1948 | Silverman | 260—88.7 |
| 2,608,554 | 8/1952 | Bullitt | 260—88.7 |
| 2,608,555 | 8/1952 | Bullitt | 260—88.7 |
| 2,873,290 | 2/1959 | Esmay et al. | 260—448 |
JOSEPH L. SCHOFER, *Primary Examiner.*
HARRY WONG, JR., *Assistant Examiner.*
U.S. Cl. X.R.
260—29.1